United States Patent [19]

Arnaudeau

[11] Patent Number: 4,894,069

[45] **Date of Patent: * Jan. 16, 1990**

[54] METHOD OF CONVEYING AN ESSENTIALLY GASEOUS FLUID THROUGH A PIPE

[75] Inventor: Marcel Arnaudeau, Paris, France

[73] Assignee: Institut Francais du Petrole, Rueil-Malmaison, France

[ * ] Notice: The portion of the term of this patent subsequent to Jan. 12, 1999 has been disclaimed.

[21] Appl. No.: 212,079

[22] Filed: Jun. 28, 1988

Related U.S. Application Data

[63] Continuation-in-part of Ser. No. 802,904, Nov. 29, 1985, abandoned, which is a continuation of Ser. No. 343,624, Jan. 28, 1982, abandoned, and a continuation of Ser. No. 11,818, Feb. 13, 1979, Pat. No. 4,325,712.

[30] Foreign Application Priority Data

Feb. 13, 1978 [FR] France ............ 78 04331

[51] Int. Cl.$^4$ ............ B01D 47/00

[52] U.S. Cl. ............ 55/89; 55/92; 137/13

[58] Field of Search ............ 55/46, 48, 203, 457, 55/467, 89, 92; 137/9, 13; 415/116, 117, 71, 73, 199.1; 417/53, 54, 313, 351

[56] References Cited

U.S. PATENT DOCUMENTS

| | | | |
|---|---|---|---|
| 774,851 | 11/1904 | McKee . | |
| 1,452,265 | 4/1923 | Collins et al. | 137/9 |
| 2,231,500 | 2/1941 | Harlow | 137/13 |
| 3,269,401 | 8/1966 | Scott et al. | 137/13 |
| 3,548,846 | 12/1970 | Allen | 137/13 |
| 3,659,960 | 5/1972 | Dunlop | 417/53 |
| 4,010,622 | 3/1977 | Ettner | 62/48 |
| 4,310,335 | 1/1982 | Arnaudeau | 55/46 |
| 4,325,712 | 4/1982 | Arnaudeau | 55/48 |

FOREIGN PATENT DOCUMENTS

| | | |
|---|---|---|
| 2105926 | 10/1971 | Fed. Rep. of Germany . |
| 2333139 | 6/1977 | France . |
| 1561454 | 2/1980 | United Kingdom . |

*Primary Examiner*—Bernard Nozick
*Attorney, Agent, or Firm*—Millen, White & Zelano

[57] ABSTRACT

This invention comprises a device and method for producing and conveying a diphasic fluid. The method comprises mixing the gas with a liquid to produce a diphasic fluid which is forced into a pipe by diphasic fluid pumping means, the amount of the added liquid depending on the maximum value of the gas-to-liquid volumetric ratio of the diphasic fluid which can be processed by the pumping means. A further refinement is achieved by separating a portion of the liquid phase from the pressurized diphasic fluid and recycling it to the mixing stage. The device comprises means for mixing the substantially gaseous fluid with sufficient liquid to form a diphasic fluid having the predetermined gas-to-liquid ratio for the pump. The means for mixing also includes means for equalizing the pressure of the gas and liquid prior to mixing and conveying through the pipe.

16 Claims, 3 Drawing Sheets

METHOD OF CONVEYING AN ESSENTIALLY GASEOUS FLUID THROUGH A PIPE

CROSS-REFERENCE TO RELATED APPLICATIONS

This application is a continuation in part of application Ser. No. 802,904, filed Nov. 29, 1985, now abandoned, which is a continuation of application Ser. No. 343,624, filed Jan. 28, 1982, now abandoned, and application Ser. No. 101,818, filed Feb. 13, 1979, now U.S. Pat. No. 4,325,712.

BACKGROUND OF THE INVENTION

The present invention relates to a method and device for conveying through a pipe a substantially gaseous fluid, but which may also contain a liquid phase.

At the present time conveying such a fluid through a pipe requires a preliminary separation of the liquid from the gas phase.

Thereafter one of the following techniques is applied: compression of the gas or liquefaction of the gas and then pumping thereof. The first of these techniques requires the use of compressors which are expensive and not very reliable. The second technique is expensive, owing to the gas liquefaction.

OBJECTS OF THE INVENTION

The object of the present invention is to obviate these drawbacks by providing a method and an apparatus which can as well be used to convey a diphasic fluid whose volumetric gas-to-liquid ratio is high, or to convey a simple gas. In both cases the apparatus for carrying out the proposed method not only is more reliable and less expensive than the apparatuses based on the above-mentioned prior techniques, but also less cumbersome, which is of particular advantage when such apparatus is to be installed on floating or submerged marine structures.

SUMMARY OF THE INVENTION

The present invention provides a method for conveying through a pipe a fluid comprising essentially a gas, wherein a diphasic fluid is produced by mixing the gas with a liquid and wherein said diphasic fluid is conveyed through the pipe under increased pressure obtained by means of suitable pumping means, the amount of liquid mixed with the gas being determined in relation with the maximum value of the gas-to-liquid volumetric ratio of the diphasic fluid, which can be processed by said pumping means.

BRIEF DESCRIPTION OF THE DRAWINGS

The invention will be better understood and all the advantages thereof made apparent from the following description, illustrated by the accompanying drawings wherein.

DETAILED DISCUSSION

In the following, reference will be made more particularly, but not limitatively, to the transportation of a gaseous petroleum effluent through a pipe between two determined sites, of which one may be the production site, the gas remaining in place within the geological formations.

Figure 1:
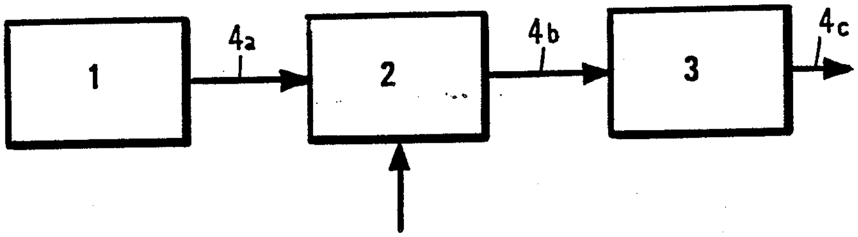
FIG. 1 diagrammatically illustrates a first embodiment of the invention.

FIG. 1 diagrammatically illustrates the method according to the invention for circulating through a pipe 4a, 4b, 4c a gaseous petroleum effluent flowing from a source diagrammatically indicated at 1. This petroleum effluent may be fully gaseous or in the form of a diphasic fluid (comprising a gas phase and a liquid phase which may or may not be saturated). In both cases the volumetric gas-to-liquid ratio, equal to the ratio of the gas volume to the liquid volume is very high under the thermodynamic conditions of the petroleum effluent. According to the invention, this volumetric ratio is reduced by the introduction of a liquid, using a mixing element diagrammatically indicated at 2. There is thus obtained a diphasic fluid whose pressure can be raised to a sufficient value by a pumping element 3 capable of processing the fluid delivered by element 2. The pressurized diphasic fluid delivered by pumping element 3 can then flow through pipe 4c.

The liquid used for reducing the volumetric ratio before pumping can be selected from the liquids which are miscible with the gas to be conveyed. This liquid can be derived from a natural source near the pumping station (for example water or oil from a petroleum layer in the case of petroleum effluents . . . etc.) Alternatively this liquid can be produced on the spot or conveyed thereto.

Figure 2:
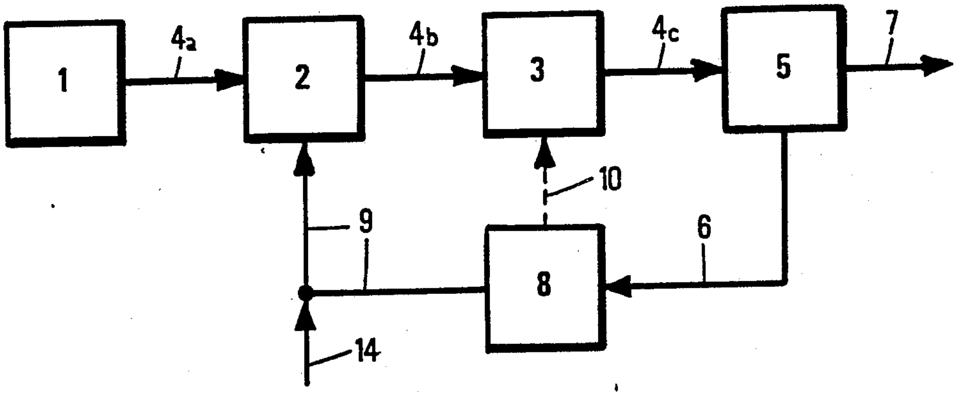
FIGS. 2 and 3 illustrate two further embodiments.

FIG. 2 diagrammatically shows a first modification of the method according to the invention, wherein the fluid leaving pumping element 3 is introduced into a separator 5 which delivers to pipe 7 the fluid to be conveyed, while at least one portion of the liquid phase which may or may not be saturated with gas is reintroduced into element 2 through pipes 6 and 9, after reduction of the fluid pressure in a pressure-reducing device 8 which may be of a type recovering at least a fraction of the power corresponding to this pressure reduction (for example a hydraulic motor). This pressure reduction is generally accompanied by the formation of a gas phase, which, in the case of a multi-stage pumping element 3, may be directly introduced through pipe 10 into the stage at the inlet of which the prevailing pressure is substantially the same as that of the so-recycled gas.

Optionally, if so required, a liguid make-up may be introduced at 14 into the recycling loop, through an inlet pipe which is also used to introduce the liquid amount required for putting the assembly into operation.

Figure 3:
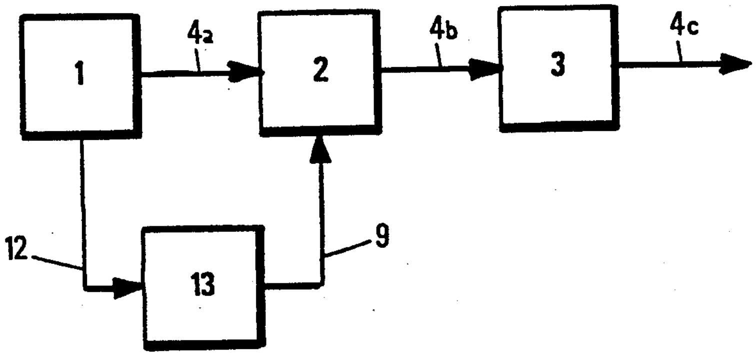

According to another embodiment, illustrated by FIG. 3, a fraction of the gas delivered by source 1 feeds, through a pipe 12, an element 13 for liquefying the gas by a chemical process.

The resulting liquid is introduced into mixing element 2 through pipe 9.

It would be obviously possible to combine the embodiments of FIGS. 2 and 3, without departing from the scope of the present invention. In this case the outlet of element 13 delivering a liquid would be connected to the liquid inlet 14.

Figure 4:
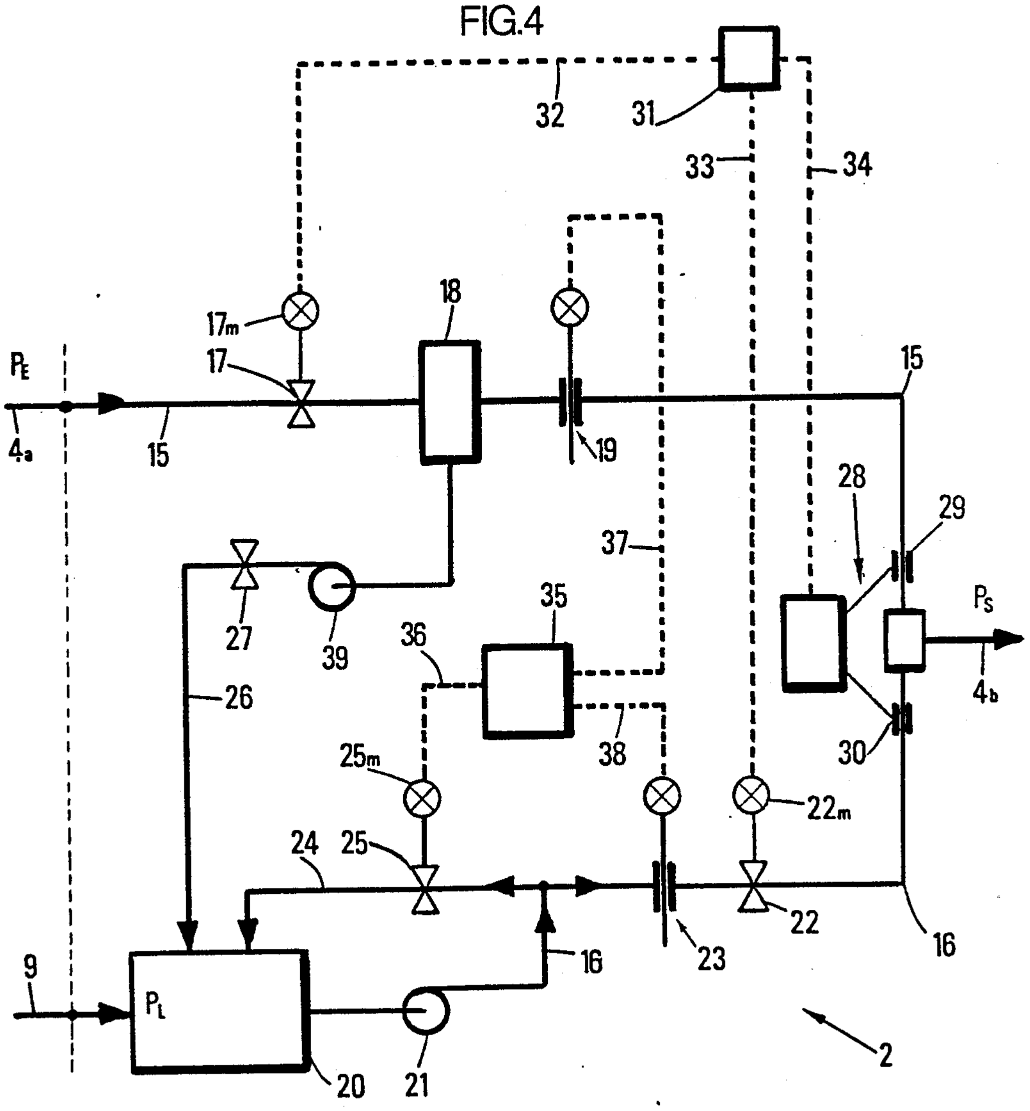
FIG. 4 diagrammatically illustrates the element for mixing the liquid and gas phases.

FIG. 4 diagrammatically illustrates an embodiment of mixing element 2 which receives the gaseous fluid from pipe 4a and a suitable liquid from pipe 9, and delivers to pipe 4b a diphasic fluid having a gas-to-liquid volumetric ratio acceptable for the pumping element 3.

The mixing element 2 comprises a pipe 15 connecting pipe 4*a* to pipe 4*b*, and a pipe 16 connecting pipes 9 and 4*b*. In series with pipe 15 are successively connected an element 17 creating an adjustable pressure drop in the gas flow, a drain tank 18 and an element 19 for measuring the volume (or flow rate) of the gas flowing through pipe 15.

In series with pipe 16 are connected a liquid tank 20, a pump 21 for pressurizing the liquid, an element 22 creating an adjustable pressure drop in the liquid flow, and an element 23 for measuring the volume (or flow rate) of the liquid flowing through pipe 16.

The outlet orifice of pump 21 is connected to tank 20 through a return pipe 24 whereon is located an element 25 creating an adjustable pressure drop.

The bottom of tank 18 is connected to a drain pipe 26 whereon is placed an element 27 permitting full or partial closure of the pipe, and optionally a circulation pump 39. Adjustment of the degree of opening of element 27, as well as operation of pump 39 can be automatically and sequentially effected by using for example a liquid level sensor (not shown) located inside tank 18. In the embodiment illustrated in FIG. 4, pipe 26 communicates with the liquid tank 20.

The mixer 2 also comprises an element diagrammatically illustrated at 28, comprising for example two pressure sensors 29 and 30 for measuring the pressure in pipes 15 and 16 respectively at locations immediately before the point of connection of these pipes to pipe 4*b*, this element 28 being adapted to deliver a signal representative of the difference of the respective pressures measured by sensors 29 and 30.

The elements 17 and 22 creating pressure drops are automatically placed into the desired position by motor means diagrammatically illustrated at 17*m* and 22*m*. These motor means are actuated by a control element 31 to which they are connected by transmission lines 32 and 33, this control circuit being responsive to the signal delivered by element 28 and transmitted by line 34.

Element 25 creating a pressure drop is automatically placed into the desired position by motor means 25*m* actuated by a control element 35 which transmits a control signal 36 in response to the signals delivered by measuring elements 19 and 23 and transmitted through lines 37 and 38.

During operation of mixing element 2, gas enters element 2 at pressure $P_E$ while the diphasic fluid is delivered to pipe 4*b* at pressure $P_S$ which is preferably slightly smaller than $P_E$. Pipe 9 supplies liquid at pressure $P_L$ whose value is generally lower by $\Delta P$ than pressure $P_S$. Pump 21 is adapted to increase the liquid pressure more than by $\Delta P$.

Element 28 delivers a signal representative of the pressure difference between pipes 15 and 16 immediately before their connection to pipe 4*b*. In response to this signal, control element 31 actuates motor means 17*m* and 22*m* which regulates elements 17 and 22 creating pressure drops, so that the pressure difference measured by element 28 is mullified.

Simultaneously, the flow rates (or volumes) of gas and liquid flowing through pipes 15 and 16 are measured by elements 19 and 23 which deliver signals representative of these flow rates, these signals being transmitted to control element 35. The latter elaborates a control signal for the motor means 25*m*, which monitors the element 25 creating a pressure drop, so that the gas-to-liquid ratio remains substantially constant at a predetermined value substantially equal to the gas-to-liquid volumetric ratio which is to be obtained for the diphasic fluid in pipe 4*b*.

Thus when the ratio of the signals delivered by elements 19 and 23 is greater than a predetermined value corresponding to the value of the gas-to-liquid volumetric ratio which should be obtained in pipe 4*b*, control element 35 increases the value of the pressure drop at 25, which reduces the liquid flow rate in pipe 24 and consequently increases the flow rate in pipe 16.

On the contrary, when the ratio of the signals delivered by elements 19 and 23 is smaller than the predetermined value the control element 35 reduces the value of the pressure drop at 25, which increases the flow rate in pipe 24 and consequently reduces the liquid flow rate in pipe 16.

In other words, the mixing element 2 equalizes the gas and liquid pressures before mixing thereof, by controlling the values of the dynamic pressure drops in the gas and liquid streams in response to the difference in the respective pressures of these streams, and also controls the liquid flow rate by the gas flow rate, in response to the gas-to-liquid volumetric ratio.

The measuring elements 19 and 23 formed, for example, by flow meters, elements 17, 22 and 25 creating pressure drops formed, for example, by adjustable diaphragms and pressure sensors 29 and 30 are well known in the art and will not be described here in more detail, the same being true of control elements 31 and 35 whose construction is within the ordinary skill of the art.

Drain tank 18 connected in series with pipe 15 permits recovery of the liquid fraction which may be contained in the gaseous flow. When however this liquid is of the same nature as the liquid contained in tank 20, it is possible, as shown in FIG. 4, to introduce the so-recovered liquid into tank 20.

Element 3 for pumping the diphasic fluid may be of any known suitable type, preferably capable of processing a diphasic fluid of high gas-to-liquid volumetric ratio. For example, but not exclusively one may use the device or pumping a diphasic fluid which is described in French patent specification No. 2,333,139. The reference discloses - pump capable of pumping a diphasic fluid having a volumetric ratio at the input of the pump which may be equal to or higher than 0.9. The volumeric ratio at the outlet of the pump has a value lower than the volumetric ratio of the fluid at the inlet of the device.

In principle, a diphasic pump can pump a monophasic liquid, or can compress a monophasic gas. Conversely, an advantage of a diphasic pump is that it can compress a fluid mixture containing at least 1 mole of liquid per 1,000 moles of gas, especially at least one percent by weight of liquid, which generally cannot be industrially accomplished by conventional compressors. (In the case of methane and water, it corresponds roughly to a liquid-to-gas weight ratio of 0.1 percent and in the case of air and water, it corresponds to a liquid-to-gas weight ratio of 0.2 percent, these ratios depending on the partial pressure of the liquid measured according to the gas suction pressure and temperature.)

Likewise, a diphasic pump can pump a fluid containing more free gas than permitted in liquids to be pumped by conventional pumps. In the case of a conventional liquid pump, the permissible upper limit of free gas-to-liquid volumetric ratio is roughly about 5 to 10 percent, depending on the admittance pressure and temperature conditions. Thus, an advantage of a diphasic pump is that it can efficiently pump a fluid having a free gas-to-liquid ratio of at least 0.1, especially at least about 0.2.

On the other hand, from the standpoint of industrially acceptable operability, diphasic pumps, depending on the type, the operating conditions, and the properties of the fluids involved, generally require that a sufficient amount of liquid be present in the mixture to be pumped, preferably sufficient that the mixture is predominantly liquid on a weight basis. The required minimum amount of liquid in turn yields a gas-to-liquid volumetric ratio substantial equal to the maximum value capable of being pumped by the pump.

Figure 5:
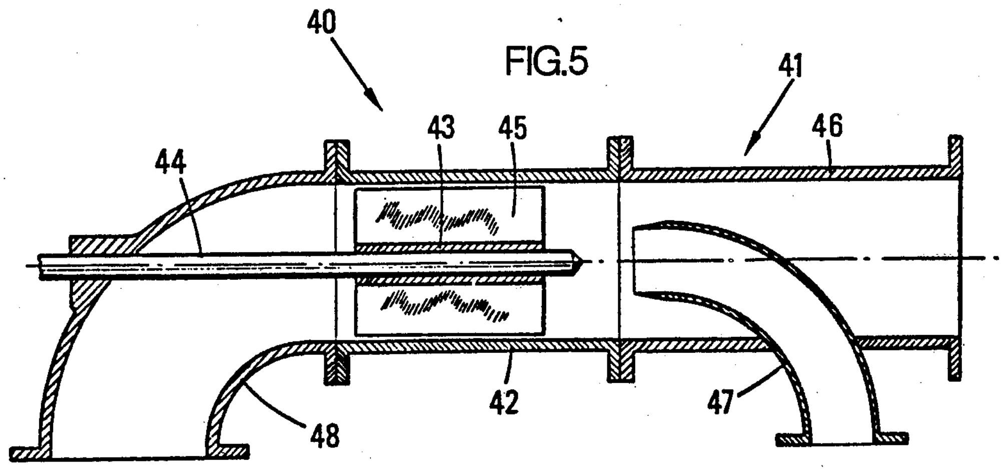
FIGS. 5, 6A, 6B and 6C illustrate an embodiment of the separating element.

The gas-liquid separator 5 of FIG. 1 may be of any known type. FIG. 5 shows by way of example a possible embodiment of this separator which comprises essentially an active element 40, capable of driving the diphasic fluid in a rotational movement in the plane at right angles to the direction of flow and a distributing element 41 which separately delivers the gaseous and liquid fluids, preferably without substantial reduction in pressure.

The active element 40 comprises a tubular body 42 housing a rotor 43 driven in rotation by the shaft 44 of a (not shown) motor. This rotor is provided with blades 45 which, as diagrammatically illustrated by FIGS. 6A, 6B and 6C representing a developed view of the rotor, may be flat and radially arranged (FIG, 6A), or inclined to the rotation axis (FIG. 6B), or curved (FIG. 6C).

Figures 6A, 6B, 6C:
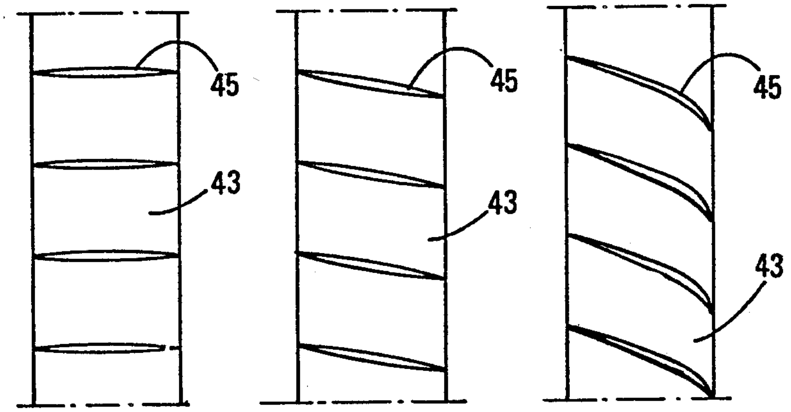

In the embodiment of FIGS. 6B and 6C the inclination angle of the blades 45 to the rotation axis of rotor 43 is determined as a function of the axial flow rate and of the rotation speed of rotor 43.

Under the action of the centrifugal force developed by the rotation, a separation of the liquid and gas phases is obtained, the gas phase being maintained in the center of the flow while the liquid phase, of higher density, is more distant from the rotation axis of the rotor.

The ends of rotor 43 are optionally profiled so as to substantially obviate any disturbance in the fluid flow.

Under these conditions, as can be seen in FIG. 5, the distributing element 41 is formed of two tubes 46 and 47 which are coaxial over a fraction of their length, the smaller of these tubes gathering practically only the gas phase.

The diphasic fluid is introduced into the assembly 40–41 through a connecting tube 48.

Changes may obviously be made without departing from the scope of the present invention. Thus, for example, when using as the pumping means 3 a device of the type described in French Patent specification No. 2,333,139, the element 40 may be omitted and the distributing element may be directly secured to the outlet of the pumping means.

The embodiment of element 40 illustrated by FIG. 5 comprises only one rotor, but it will be possible to use two separate rotors driven by separate motors whose running speeds are continuously adaptable.

I claim:

1. A method for pressurizing and conveying a substantially gaseous fluid from a site of a geological source to a remote location through a pipe having an inlet connected to the geological source from which the gaseous fluid is obtained, which method comprises the steps of:

(a) establishing communication between said pipe and a pump having an outlet and an inlet, the pump being capable of pumping and increasing the pressure of diphasic fluids;

(b) admixing said substantially gaseous fluid with a liquid at the inlet of the pump to produce diphasic fluid comprising a mixture of a gas and a liquid, sufficient liquid being added in said mixing for producing a diphasic fluid having a gas-to-liquid volumetric ratio substantially equal to the maximum value capable of being pumped by the pump;

(c) pumping and increasing the prssure of the diphasic fluid from step (b) with the pump capable of pumping and increasing the pressure of diphasic fluids for producing a pressurized diphasic fluid, this pressurized diphasic fluid comprising a gaseous phase and a liquid phase; and (d) conveying the pressurized diphasic fluid from step (c) through the pipe to said remote location.

2. A method according to claim 1, wherein the mixture of a gas and a liquid in step (b) is predominantly liquid on a weight basis.

3. A method according to claim 1, wherein said mixture of a gas and a liquid in step (b) contains more than 1 mole of liquid per 1,000 moles of gas.

4. A method according to claim 1, wherein sufficient liquid is added to the substantially gaseous fluid so that the diphasic fluid produced has a gas-to-liquid volumetric ratio at the intake of the pump substantially equal to about 0.9.

5. A method for pressurizing and conveying a substantially gaseous fluid from a site of a geological formation to a remote location through a pipe having an inlet connected to the geological source from which the substantially gaseous fluid is obtained, which comprises the steps of:

(a) establishing communication between said pipe and a pump having an outlet and an inlet, the pump being capable of pumping and increasing the pressure of diphasic fluids;

(b) admixing said substantially gaseous fluid with a liquid at the inlet of the pump to produce diphasic fluid comprising a mixture of a gas and a liquid, sufficient liquid being added in said mixing for producing a diphasic fluid having a gas-to-liquid volumetric ratio substantially equal to the maximum value capable of being pumped by the pump;

(c) pumping and increasing the pressure of the diphasic fluid from step (b) with the pump capable of pumping and increasing the pressure of diphasic fluids for producing a pressurized diphasic fluid, this pressurized diphasic fluid comprising a gaseous phase and a liquid phase; and (d) separating from resultant pressurized diphasic fluid from step (c) at least a portion of the liquid phase thereof, the remaining pressurized fluid having a higher gas-to-liquid volumetric ratio than the gas-to-liquid volumetric ratio of the diphasic fluid from step (c); and wherein the remaining pressurized diphasic fluid from the separating step is conveyed through the pipe to said remote location.

6. A method according to claim 5, wherein the mixture of a gas and a liquid in step (b) is predominantly liquid on a weight basis.

7. A method according to claim 5, wherein said mixture of a gas and a liquid in step (b) contains more than 1 mole of liquid per 1,000 moles of gas.

8. A method according to claim 5, wherein the liquid used in step (a) is miscible with said substantially gaseous fluid.

9. The method of claim 5 wherein said remaining pressurized fluid has a gas-to-liquid volumetric ratio higher than that capable of being pumped by said pump.

10. A method according to claim 5, wherein sufficient liquid is added to the substantially gaseous fluid so that the diphasic fluid produced has a gas-to-liquid volumetric ratio at the intake of the pump substantially equal to about 0.9.

11. A method according to claim 5, wherein said portion of the separated liquid phase is recycled to step (a).

12. A method according to claim 5, wherein the separating step is effected without substantial reduction in pressure.

13. A method according to claim 5, wherein in the separating step the pressurized diphasic fluid from step (c) is driven in rotation in a plane substantially perpendicular to its direction of flow to effect a centrifugal separation of the diphasic fluid into a pressurized substantially liquid phase and a pressurized substantially gaseous phase, said portion of the liquid phase being separated from said pressurized substantially liquid phase, and the remaining fluid being conveyed in step (d).

14. A method according to claim 13, wherein said separated liquid portion is substantially all of said pressurized substantially liquid phase, and wherein substantially only said pressurized substantially gaseous phase is conveyed in step (d).

15. A method according to claim 14, wherein said centrifugal separation is effected without substantial reduction in pressure.

16. A method according to claim 15, wherein said separated pressurized substantially liquid phase is recycled to step (a).

* * * * *